(12) United States Patent
Rao et al.

(10) Patent No.: US 11,054,149 B2
(45) Date of Patent: Jul. 6, 2021

(54) SECTIONABLE FLOOR HEATING SYSTEM

(71) Applicant: United States Gypsum Company, Chicago, IL (US)

(72) Inventors: Ajith Rao, Gurnee, IL (US); Suman Sinha Ray, Chicago, IL (US)

(73) Assignee: UNITED STATES GYPSUM COMPANY, Chicago, IL (US)

( * ) Notice: Subject to any disclaimer, the term of this patent is extended or adjusted under 35 U.S.C. 154(b) by 244 days.

(21) Appl. No.: 16/179,878

(22) Filed: Nov. 2, 2018

(65) Prior Publication Data
US 2019/0137114 A1    May 9, 2019

Related U.S. Application Data

(63) Continuation of application No. 15/977,373, filed on May 11, 2018, now Pat. No. 10,775,050.

(60) Provisional application No. 62/506,766, filed on May 16, 2017.

(51) Int. Cl.
| | | |
|---|---|---|
| *F24D 13/02* | (2006.01) | |
| *E04F 15/16* | (2006.01) | |
| *H05B 3/36* | (2006.01) | |

(52) U.S. Cl.
CPC .......... *F24D 13/024* (2013.01); *E04F 15/166* (2013.01); *H05B 3/36* (2013.01); *H05B 2203/007* (2013.01); *H05B 2203/013* (2013.01); *H05B 2203/026* (2013.01)

(58) Field of Classification Search
None
See application file for complete search history.

(56) References Cited

U.S. PATENT DOCUMENTS

| | | | | |
|---|---|---|---|---|
| 2,521,540 A | * | 9/1950 | Richardson | ........... F24D 13/022 |
| | | | | 392/435 |
| 2,544,547 A | * | 3/1951 | Vogel | ....................... H05B 3/16 |
| | | | | 219/522 |
| 2,762,896 A | * | 9/1956 | Pendleton | ............. F24D 13/022 |
| | | | | 219/539 |

(Continued)

FOREIGN PATENT DOCUMENTS

| | | |
|---|---|---|
| DE | 3042419 A1 | 8/1982 |
| DE | 10052345 A1 | 5/2002 |

(Continued)

OTHER PUBLICATIONS

Schwaiger, International Search Report from PCT/US2019/059068 dated Mar. 23, 2020 (5 pages).

(Continued)

*Primary Examiner* — Thor S Campbell
(74) *Attorney, Agent, or Firm* — Greer, Burns & Crain Ltd.; Philip T. Petti; Pradip Sahu

(57) ABSTRACT

A heating system for a floor is provided and includes a plurality of heating devices, where each of the heating devices includes a membrane, and a plurality of heating elements and at least one electrical coupling member attached to the membrane. At least one heating device coupling member is attached to the at least one electrical coupling member on adjacent heating devices of the plurality of heating devices, where the at least one heating device coupling member conveys electricity between the adjacent heating devices.

11 Claims, 15 Drawing Sheets

(56) References Cited

U.S. PATENT DOCUMENTS

| | | | | |
|---|---|---|---|---|
| 2,844,696 A * | 7/1958 | Custer, Jr. | ............... | H05B 3/342 |
| | | | | 219/213 |
| 3,223,825 A * | 12/1965 | Williams | ................. | H05B 3/28 |
| | | | | 219/213 |
| 3,236,991 A * | 2/1966 | Graham | ................. | E01C 11/265 |
| | | | | 219/213 |
| 3,260,835 A * | 7/1966 | Soukey | ................. | H01R 29/00 |
| | | | | 219/213 |
| 3,878,362 A * | 4/1975 | Stinger | ................. | B32B 27/06 |
| | | | | 219/528 |
| 4,323,607 A * | 4/1982 | Nishimura | ............. | B29C 65/68 |
| | | | | 219/213 |
| 4,429,216 A * | 1/1984 | Brigham | ................ | H05B 3/145 |
| | | | | 219/528 |
| 4,485,297 A * | 11/1984 | Grise | ....................... | H05B 3/56 |
| | | | | 219/528 |
| 4,523,085 A * | 6/1985 | Grise | ..................... | H05B 3/565 |
| | | | | 174/254 |
| 4,534,886 A * | 8/1985 | Kraus | .................. | B29C 70/504 |
| | | | | 252/502 |
| 4,564,745 A * | 1/1986 | Deschenes | ............. | H05B 3/283 |
| | | | | 219/213 |
| 4,774,397 A * | 9/1988 | Grise | ..................... | H05B 3/06 |
| | | | | 219/528 |
| 4,814,580 A * | 3/1989 | Carageorge | ............. | H05B 3/28 |
| | | | | 219/213 |
| 5,451,743 A * | 9/1995 | du Preez | ............... | F24D 13/022 |
| | | | | 219/200 |
| 6,184,496 B1 * | 2/2001 | Pearce | ................. | E01C 11/265 |
| | | | | 219/202 |
| 6,211,493 B1 * | 4/2001 | Bouman | ............... | E01C 11/265 |
| | | | | 219/213 |
| 6,727,471 B2 * | 4/2004 | Evans | ................... | E01C 11/265 |
| | | | | 219/213 |
| 6,855,915 B2 * | 2/2005 | Gehring | ................... | H05B 3/36 |
| | | | | 219/213 |
| 6,897,417 B1 * | 5/2005 | Usselman | ............. | H05B 3/342 |
| | | | | 219/202 |
| 6,943,320 B1 * | 9/2005 | Bavett | ...................... | H05B 3/34 |
| | | | | 219/213 |
| D514,209 S * | 1/2006 | Evans | .......................... | D23/314 |
| 7,121,056 B2 * | 10/2006 | McKenna | ................. | E04D 1/26 |
| | | | | 52/518 |
| 7,139,471 B1 * | 11/2006 | Durham | ................ | E04D 13/103 |
| | | | | 392/437 |
| 7,308,193 B2 * | 12/2007 | Halsall | ................... | F24H 1/202 |
| | | | | 219/548 |
| 7,876,194 B2 * | 1/2011 | Ihle | ......................... | H01C 7/02 |
| | | | | 338/212 |
| 8,258,443 B2 * | 9/2012 | Caterina | ............... | F24D 13/024 |
| | | | | 219/530 |
| 8,288,693 B2 * | 10/2012 | Weiss | ...................... | H05B 3/84 |
| | | | | 219/541 |
| 8,816,251 B2 * | 8/2014 | Olsen | ..................... | F24D 3/141 |
| | | | | 219/212 |
| 8,835,809 B2 * | 9/2014 | Dohring | ................ | F24D 13/024 |
| | | | | 219/213 |
| 8,886,026 B2 * | 11/2014 | Gilad | .................... | F24D 13/024 |
| | | | | 392/432 |
| 9,290,890 B2 * | 3/2016 | Naylor | ................... | E01C 23/03 |
| 9,297,541 B1 * | 3/2016 | McGillycuddy | ........ | E04C 2/525 |
| 10,119,709 B2 * | 11/2018 | Dohring | ................ | H05B 3/145 |
| 2005/0067402 A1 * | 3/2005 | Green | .................. | D03D 13/006 |
| | | | | 219/515 |
| 2005/0067404 A1 * | 3/2005 | DeAngelis | ............. | H05B 3/347 |
| | | | | 219/545 |
| 2005/0067405 A1 * | 3/2005 | DeAngelis | ............... | H05B 3/34 |
| | | | | 219/549 |
| 2010/0320191 A1 * | 12/2010 | Von Wachenfeldt | .. | H05B 3/145 |
| | | | | 219/548 |
| 2011/0147358 A1 * | 6/2011 | Kober | ................... | F24D 13/022 |
| | | | | 219/202 |
| 2012/0273479 A1 | 11/2012 | Kim | | |

FOREIGN PATENT DOCUMENTS

| | | |
|---|---|---|
| DE | 202006007731 U1 | 8/2006 |
| EP | 2618630 A2 | 7/2013 |
| EP | 2921084 A1 | 9/2015 |
| JP | 2007149598 A | 6/2007 |
| WO | 2011128899 A2 | 10/2011 |

OTHER PUBLICATIONS

Barzic, International Search Report for Application No. PCT/US2018/032900, dated Mar. 8, 2018.

Corresponding U.S. Appl. No. 15/977,373, filed May 11, 2018.

* cited by examiner

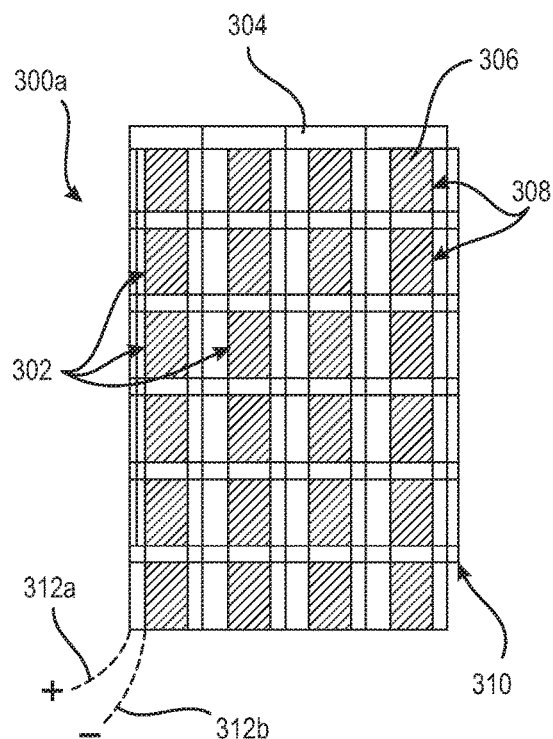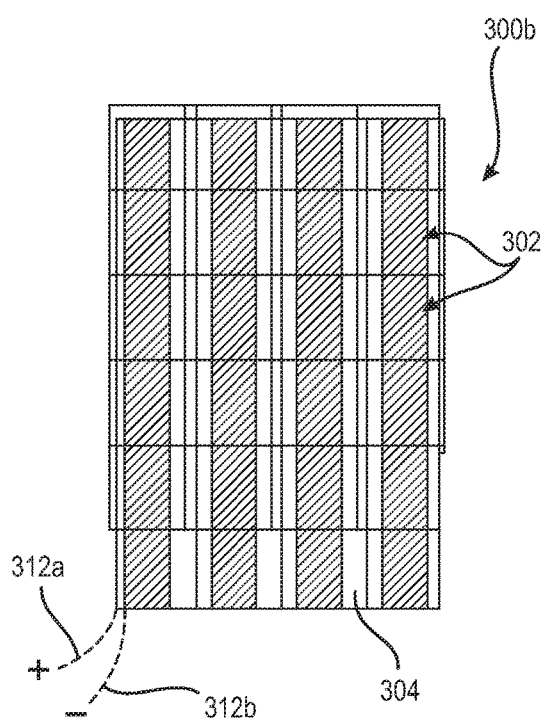
Fig. 8
Fig. 9
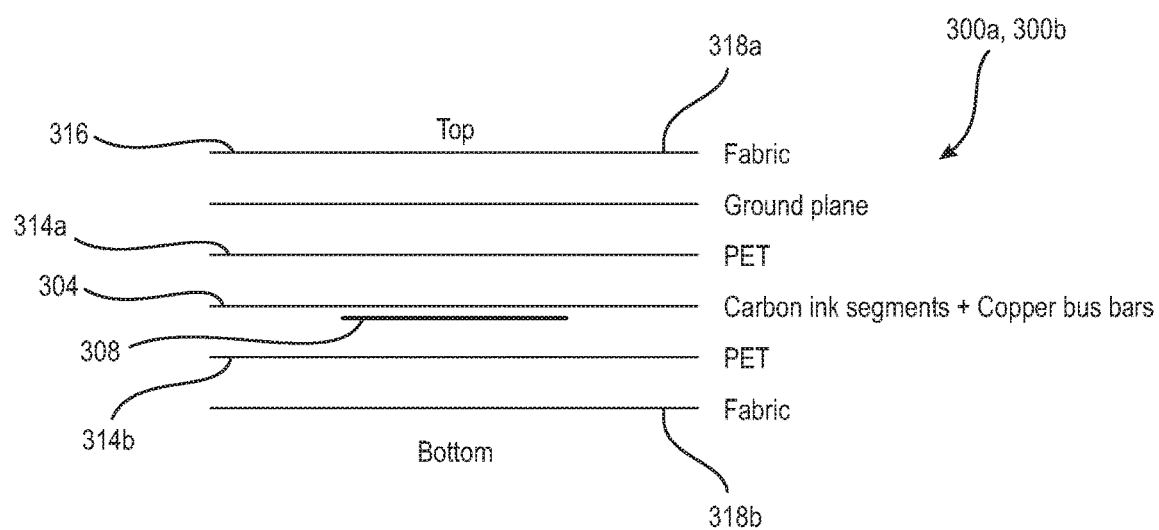
Fig. 10

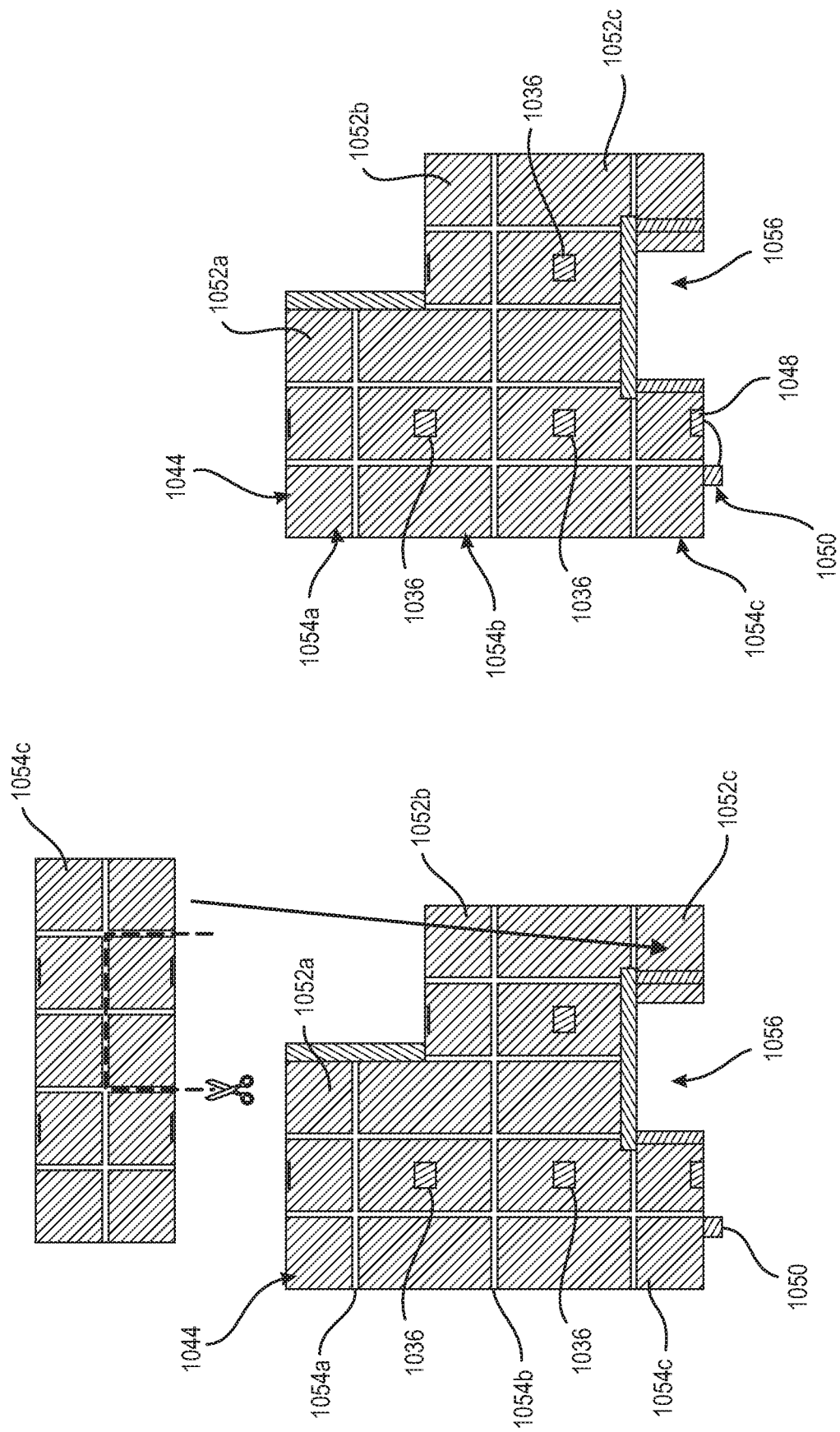

SECTIONABLE FLOOR HEATING SYSTEM

CROSS REFERENCE TO RELATED APPLICATIONS

This application is a continuation-in-part application of and claims priority to U.S. patent application Ser. No. 15/977,373 filed on May 11, 2018, which is a non-provisional application of and claims priority to Provisional Application No. 62/506,766 filed on May 16, 2017, wherein all of these applications are incorporated herein by reference in their entireties.

BACKGROUND

The present invention relates to a flooring system, and more specifically, to a heating device for a flooring system that generates radiant heat underneath a floor so that the floor is at a comfortable temperature for directly receiving a user's bare feet, along with other body parts directly contacting the floor.

There are two basic ways to supply heat to a floor: hot water or electricity. Hot-water or "hydronic" systems circulate water from a boiler or water heater through loops of tubing installed beneath a floor. The flexible tubes are installed in a variety of ways, such as on top of a subfloor in grooved panels or snap-in grids, or embedded in poured concrete. Once the heating system is in place, the heating system can be covered by finished flooring, including hardwood or tile. The issues with these systems are that they are complex, require significant time and effort to install and are expensive.

An electric system provides radiant heat from one or more heating elements connected to an electrical power source. Referring to FIG. 1, one type of electrical heating system is shown and includes thin resistors, namely, thin film resistors, positioned between and electrically connected to two busbars acting as a positively charged terminal and a negatively charged terminal, the busbars being located on opposing sides of a base substrate. Typically, the base substrate is made of a flexible material, such as a flexible plastic or fiberglass, so that the heating system can be rolled up and transported to a location for installation. After installation, electricity is supplied to the heating elements, which causes the heating elements to generate heat that is directed to the bottom surface of a finished floor installed above the heating system.

FIG. 2 shows an alternative known electrical heating system in which an electrical wire or cable is attached to a base substrate and winds between the opposing sides of the base substrate. The electrical wire is attached to a power source which supplies electricity to the wire to cause the wire to generate heat beneath a finished floor. Since the electrical heating systems shown in FIGS. 1 and 2 do not require a boiler, water, or tubing as with the hot water heating system, less space is needed underneath the finished floor to install the electrical heating systems.

FIG. 3 is an example of a conventional electrical heating system that includes a positively charged electrode or anode 52a attached to one side of a base substrate and a negatively charged electrode or cathode 52b attached to an opposing side of the base substrate. Typically, the positively charged electrode and the negatively charged electrode are busbars attached to the opposing sides of the base substrate. The anode and the cathode are electrically connected to heating elements 50a, which are spaced apart at different locations on the base substrate, and supply electricity to the heating elements from an electrical power source (not shown). Alternatively, in other examples, a single heating element 50b extends between the anode 54a and the cathode 54b, or the heating elements 50c are formed as elongated strips that extend between the anode 56a and the cathode 56b. In these systems, the configuration and positioning of the heating elements depends on the layout of the floor and the size and shape of the room.

A problem with the above-described known electrical heating systems is that the base substrate typically must be cut to size to accommodate a corner or other obstacle in a room where the electrical heating systems are being installed. Given that the heating elements and associated electrical connections extend in only one direction between the opposing electrodes on the base substrate, the base substrate must likewise be cut in a single direction along a cutting line 58 (FIG. 3) that is parallel to the heating elements, otherwise the electrical circuit will be cut or severed thereby breaking the electrical connection between the positive and negative electrodes and preventing the heating elements from generating heat underneath the finished floor. As such, more time and materials are used to install such electrical heating systems, and more waste materials are generated.

Accordingly, there is a need for a heating system for placement underneath a floor that can be cut to size in any direction to accommodate different floor layouts.

SUMMARY

Embodiments of the present floor heating system include a heating device having several heating elements attached to a flexible substrate or membrane. Each of the heating elements is electrically connected to positively and negatively charged electrodes that supply electrical power to the heating elements and cause the heating elements to generate and apply heat to a finished floor situated on top of the heating device. The heating elements are arranged on the membrane so that the membrane may be cut in any direction or pattern without disrupting the supply of electricity to the heating elements in the section of the heating device being used to heat a floor. The present heating system thereby saves significant time and money during installation.

In an embodiment, a heating device for a floor is provided and includes a membrane, a plurality of heating elements attached to the membrane, at least one positively charged electrode attached to each of the heating elements and at least one negatively charged electrode attached to each of the heating elements, where the at least one positively charged electrode and the at least one negatively charged electrode are connected to an electrical power source and supply electrical power to the heating elements. The heating elements, the at least one positively charged electrode and the at least one negatively charged electrode are arranged on the membrane so that cutting of the membrane along a cutting line in any direction across the membrane does not disrupt the supply of electrical power to the heating elements.

In another embodiment, a heating mat is provided and includes an insulating layer including a plurality of heating elements, a positive grid layer including a positively charged electrode attached to each of the heating elements on a first side of the insulating layer, a negative grid layer including a negatively charged electrode attached to each of the heating elements on a second side of the insulating layer, where the positive grid layer and the negative grid layer are connected to an electrical power source and supply electrical power to the heating elements, and a grounding layer attached to the positive grid layer. The insulating layer, the positive grid layer, the negative grid layer and the grounding layer are arranged so that cutting of the mat along a cutting line in any direction across the mat does not disrupt the supply of electrical power to the heating elements.

In another embodiment, a heating system for a floor is provided and includes a plurality of heating devices, where each of the heating devices includes a membrane, and a plurality of heating elements and at least one electrical coupling member attached to the membrane. At least one heating device coupling member is attached to the at least one electrical coupling member on adjacent heating devices of the plurality of heating devices, where the at least one heating device coupling member conveys electricity between the adjacent heating devices.

In a further embodiment, a method for heating a surface in a designated area is provided and includes placing a plurality of heating devices on the surface of the area, where each of the plurality of heating devices includes a membrane, and plurality of heating elements and at least one electrical coupling member attached to the membrane. The method further includes connecting at least one of the plurality of heating devices to an electrical power source that supplies electricity to the plurality of heating devices, aligning the at least one coupling member of adjacent heating devices of the plurality of heating devices and attaching a heating device coupling member to the at least one coupling member of the adjacent heating devices, where the heating device coupling member conveys electricity between the adjacent heating devices.

BRIEF DESCRIPTION OF THE DRAWINGS

FIG. 8 is a schematic drawing of another embodiment of the present floor heating system.

FIG. 9 is a schematic drawing of a further embodiment of the present floor heating system.

FIG. 10 is a schematic drawing showing the configuration of the material layers of the floor heating systems of FIGS. 8 and 9.

FIG. 25 is a schematic drawing showing a further portion of a heating mat installed on the floor area of FIG. 20.

FIG. 26 is a schematic drawing showing the floor area of FIG. 20 covered with the floor heating system of FIGS. 21 and 22.

DETAILED DESCRIPTION

The present floor heating system includes a flexible heating device having heating elements arranged in a pattern on a membrane that enables the heating device to be cut to any size or shape to accommodate different floor layouts and save significant time during installation.

Figure 1:
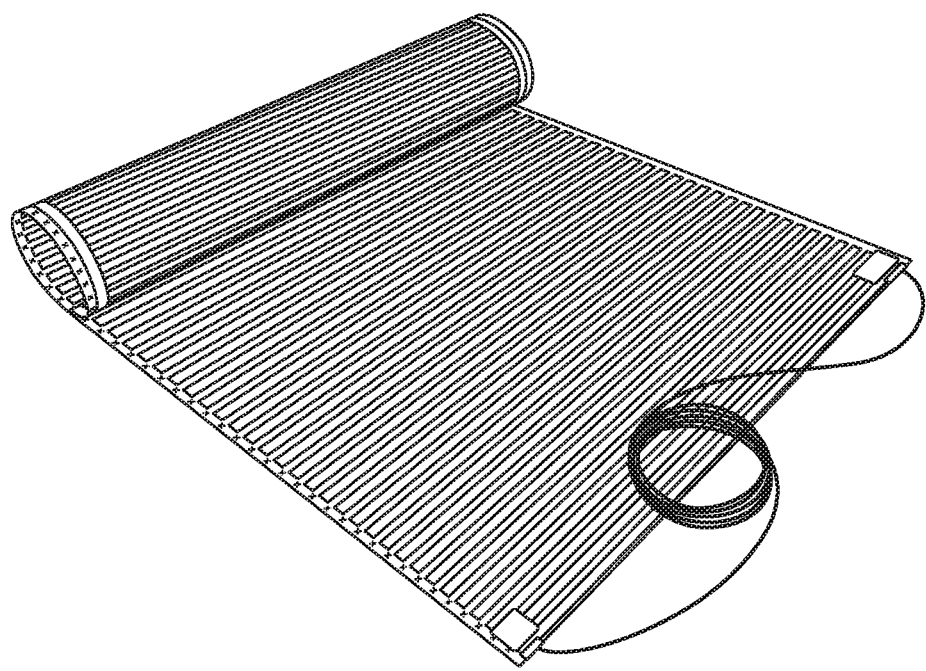
FIG. 1 is a schematic drawing of a prior art type of electrical floor heating system.
Figure 2:
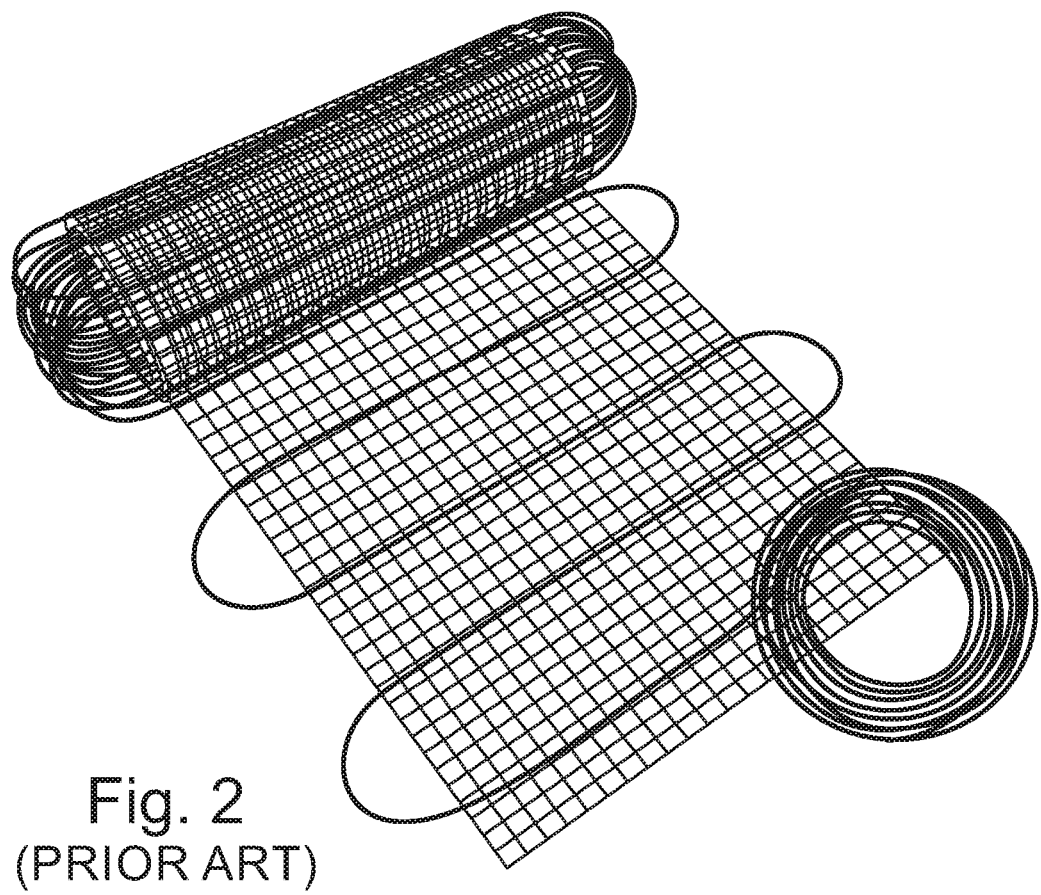
FIG. 2 is a schematic drawing of another type of electrical floor heating system.
Figure 3:
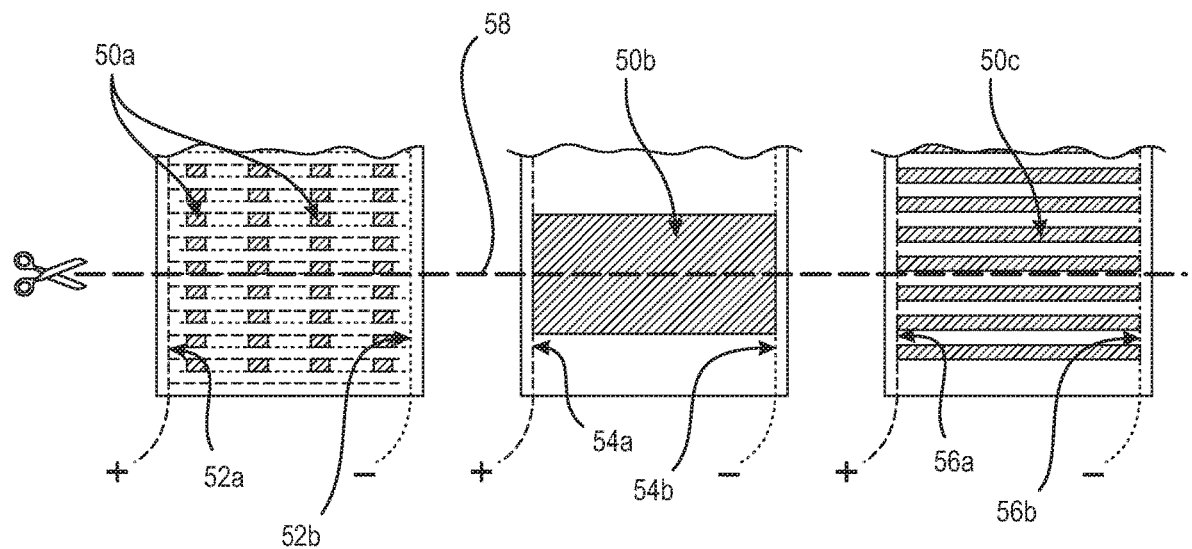
FIG. 3 are schematic drawings of different electrical diagrams for electrical floor heating systems.
Figure 4:
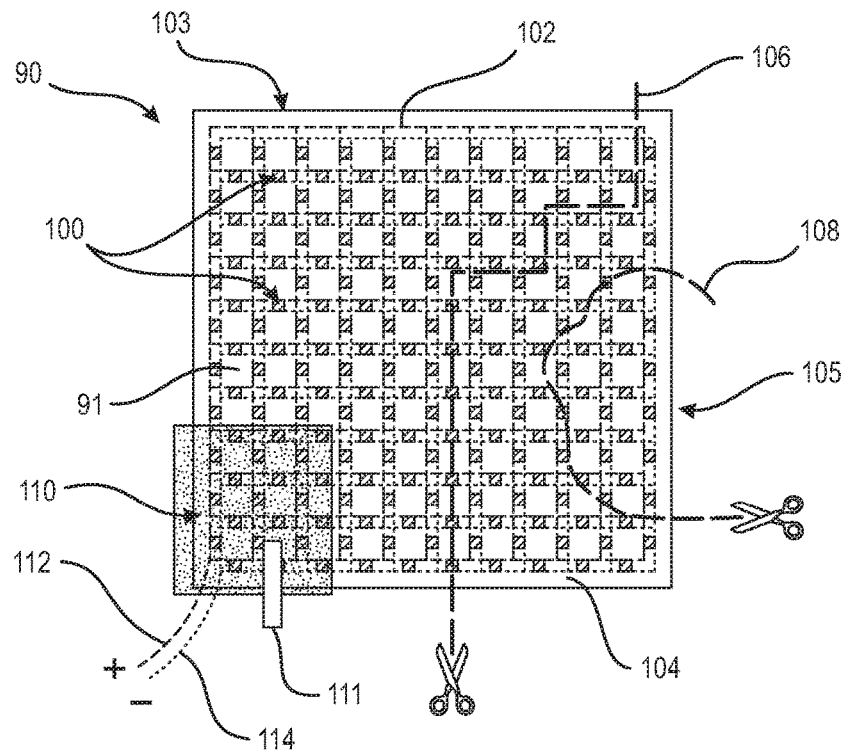
FIG. 4 is a schematic drawing of an embodiment of the present floor heating system where the heating elements are arranged in a grid pattern.

Referring to FIG. 4, an embodiment of the present floor heating system includes a heating device 90 having a flexible mat or membrane 91 made of an insulating material or insulator, such as plastic, fiberglass or other suitable material. Several heating elements 100 are arranged on the membrane 91 in a pattern such as the grid pattern shown in FIG. 4. Electricity is supplied to the heating elements 100 by positively charged electrodes or anodes and negatively charged electrodes or cathodes that are arranged in the grid pattern. As shown in the illustrated embodiment, each heating element 100 is connected to an anode 102 and a cathode 104 to supply an electrical current to the heating elements, which causes the heating elements to generate heat. The electrical current is supplied to the anodes 102 and cathodes 104 by positive and negative electrical wires or cables 112, 114 located at a corner or end of the membrane 91. In an embodiment, the electrical wires 112, 114 are attached to a plug connector (not shown), which is connected to or plugged into a power source, such as an electrical outlet. In another embodiment, the electrical wires 112, 114 are directly connected or hardwired to an electrical junction box. It should be appreciated that the electrical wires 112, 114 are connectable to any suitable power source. In the illustrated embodiment, the heating device 90 has a thin profile and may be any suitable thickness that enables the heating device to be installed beneath a finished floor.

As shown in FIG. 4, the heating elements 100 and the anodes 102 and cathodes 104 are arranged so that the membrane 91 can be cut to any desired sized and shape without breaking or disrupting the electrical circuit, i.e., the supply of electrical current to the heating elements. For example, the cutting line 106 is a staggered line that extends in two different directions, i.e., along the length and width, of the membrane 91 and separates the membrane into a first, heating section 103 and a second, non-heating section 105. The staggered cutting line 106 would be contemplated to accommodate a staggered wall, appliances or other fixed objects on or surrounding a floor.

Referring again to FIG. 4, the grid pattern of the heating elements 100 and the anodes 102 and cathodes 104 in the first section 103 maintains the supply of electrical current to the heating elements since the anodes and cathodes 102, 104 connecting the heating elements 100 to the electrical power source remain intact, i.e., are not severed by the cutting of the membrane 91 along the cutting line 106.

In another example, a second cutting line 108 is a non-linear cutting line for accommodating rounded or curved walls, corners, appliances or other objects on or surrounding a floor. As shown by the different cutting lines 106, 108, a feature of the present heating device 90 is that it is designed to be cut according to any desired pattern or along any desired cutting lines including linear cutting lines, non-linear cutting lines or any combination of linear and non-linear cutting lines, without affecting the heating capacity of the heating elements 100 located in the first heating section 103 of the heating device.

A portion of the heating device 90 is designated as a no-cut zone or area 110 to ensure that the electrical connections to the anodes and cathodes 102, 104 are not cut or severed by cuts along a desired cutting line. The no-cut zone 110 may be any suitable size and shape depending on the configuration of the heating elements 100 on the membrane 91. Additionally, in an embodiment, at least one thermocouple 111 is connected to the heating device 90 in the no-cut zone 110 to measure the temperature of the first section 103 of the heating device and maintain the heating device at a designated temperature to help prevent overheating. Connecting the thermocouple 111 to the membrane 91 in the no-cut zone 110, protects the thermocouple from being damaged or broken when the heating device 90 is cut. It should be appreciated that the thermocouple 111 may be any suitable temperature measuring device.

Figure 5:
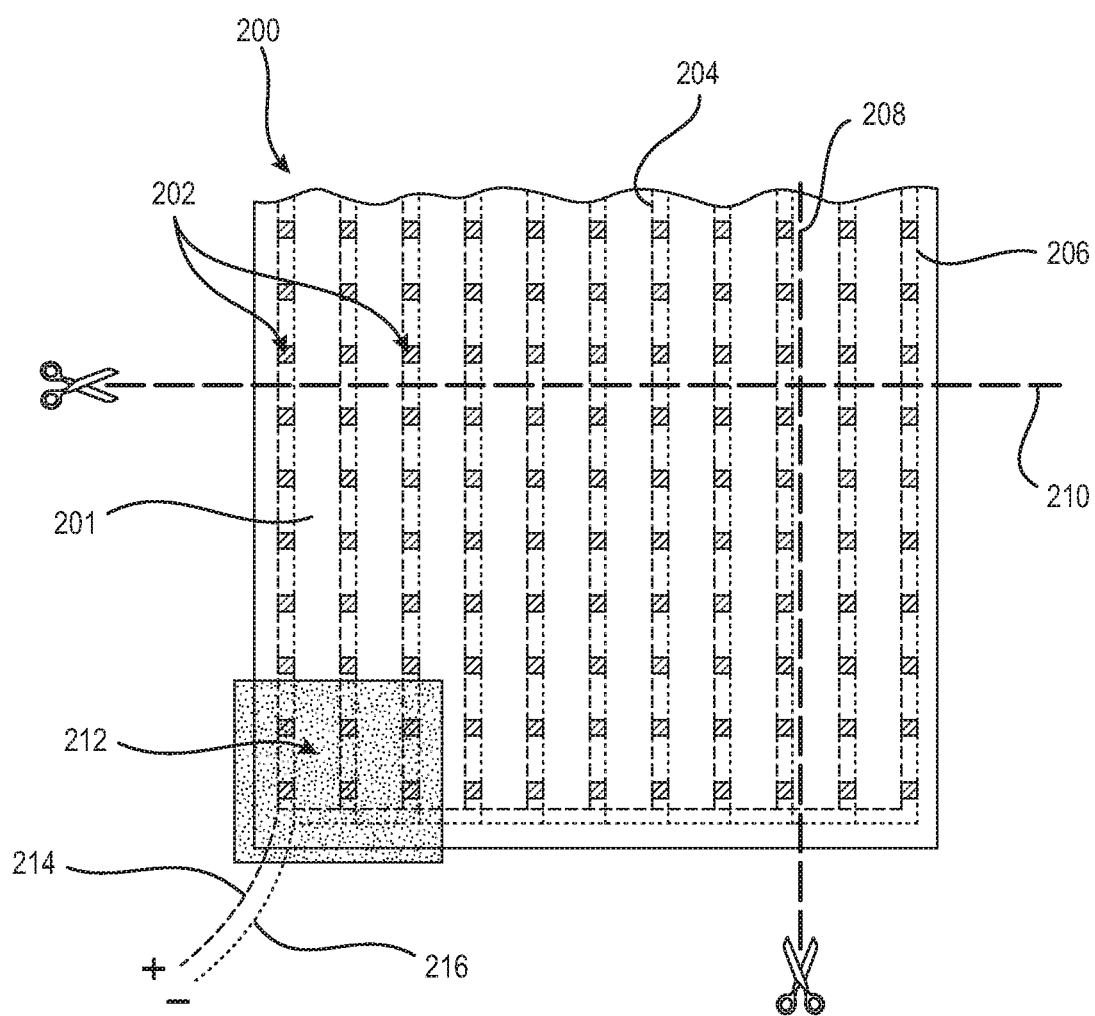
FIG. 5 is a schematic drawing of another embodiment of the present floor heating system where the heating elements are arranged in a single direction on the membrane.

Referring to FIG. 5, another embodiment of the present heating device 200 is shown and includes heating elements 202, anodes 204 and cathodes 206 that are arranged on the membrane 201 in a single direction, namely, along the length of the membrane. The heating elements 202, anodes 204 and cathodes 206 may also be arranged along the width of the membrane, in a diagonal pattern or in any suitable direction or pattern. In the illustrated embodiment, the heating elements 202 are spaced apart a designated distance from each other. The spacing of the heating elements 202 is determined by the desired heat output or heat capacity for a particular finished floor or floors. In this embodiment, the anodes and cathodes 204, 206 are connected to an electrical power source by electrical wires 214, 216 located at a corner of the heating device 200. It should be appreciated that the electrical wires may be located at any suitable location on the heating device 200. As shown in FIG. 5, the arrangement of the heating elements 202 enables the heating device 200 to be cut across the width of the membrane 201 as shown by cutting line 210, or along the length of the membrane 201 as shown by cutting line 208, without severing and thereby disrupting the electrical connection to the heating elements. It should be appreciated that both cutting lines 208 and 210 can be made along the membrane 201 or at any suitable location on the membrane other than the no-cut zone 212.

Figure 6:
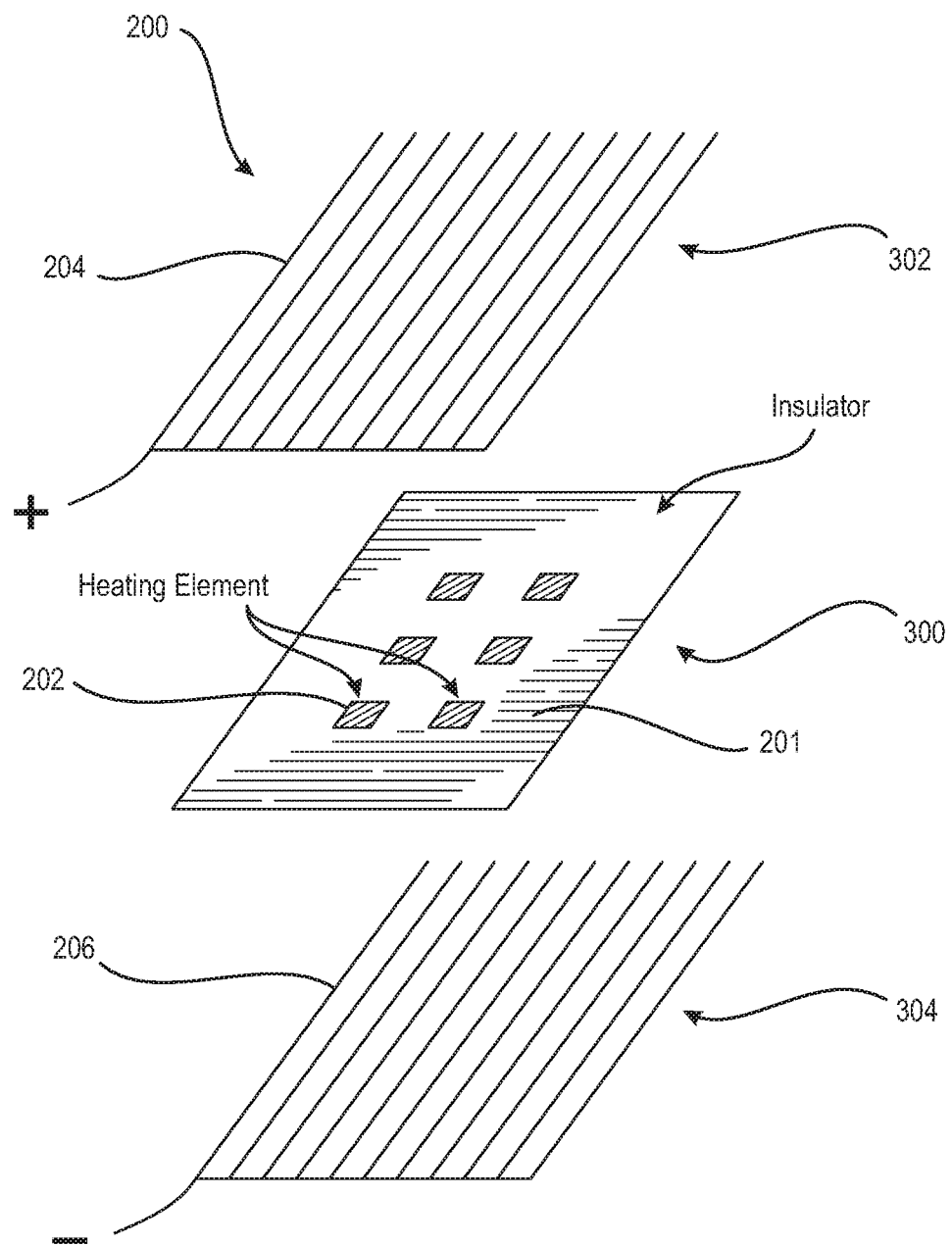
FIG. 6 is an exploded perspective view of a further embodiment of the present floor heating system.
Figure 7:
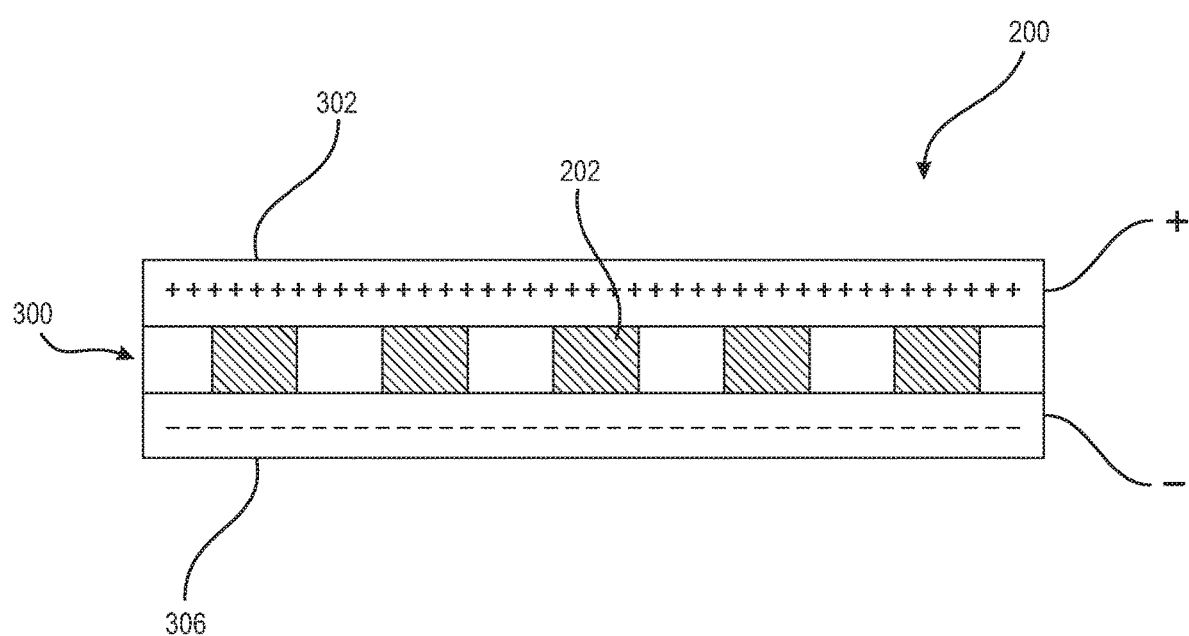
FIG. 7 is a cross-section view of the floor heating system of FIG. 6 where the first, second and third layers are attached together.

Referring to FIGS. 6 and 7, an embodiment of the construction of the heating device 200 of FIG. 5 is shown where heating device includes a first layer 300 having a membrane 201 made of an insulating material or insulator, such as plastic, and one or more heating elements 202 attached to or embedded in the membrane 201 so that opposing surfaces of the heating element or heating elements 202 are exposed on each side of the membrane. A second layer 302 including a plurality of interconnected anodes 204 having a positive charge is attached to a first side of the first layer 300 such that the anodes 204 are connected to a corresponding surface of each of the heating elements 202. A third layer 304 including a plurality of interconnected cathodes 206 having a negative charge is attached to a second side of the first layer 300, which is opposite to the first side. The cathodes 206 are connected to a corresponding surface of each of the heating elements 202. In this way, the connection of the anodes 204 and cathodes 206 to opposing surfaces of the heating element(s) 202 causes the electrical current to flow to the heating element(s) 202 to generate heat. It should be appreciated that the heating elements 202, the anodes 204 and the cathodes 206 may be arranged in any suitable direction or pattern on the membrane 201.

Referring to FIG. 8, another embodiment of the construction of the heating device is shown where the heating device 300a includes individual heating elements 302 that are printed on a membrane or substrate 304 and arranged in a grid pattern. In this embodiment, the heating elements 302 are printed on the substrate 304 with a carbon ink 306 having a designated resistance such that the heating elements 302 may operate at voltages ranging from 6 volts to 240 volts depending on the designated resistance. It should be appreciated that carbon ink 306 may be any suitable ink or combination of inks that are used to form heating elements. As shown in FIG. 8, the carbon ink segments 308 forming the heating elements 302 may have rectangular shapes or any suitable shape or combination of shapes. Further, the carbon ink segments 308 may vary in size. For example, each of the carbon ink segments 308 may be 2 inches by 2 inches to 6 inches by 6 inches in size, and may be printed on the substrate 304 using screen printing, flexographic printing, gravure printing or any suitable printing method. The carbon ink 306 may also be sprayed onto the substrate 304 to form the heating elements 302. In the illustrated embodiment, one or more busbars 310 are attached to the substrate 304 and receive electricity from electrical wires 312a and 312b, and distribute electrical power to the heating elements. The busbars 310 may be copper tape attached to the substrate 304 or copper ink printed on the substrate with the heating elements 302. It should be appreciated that the busbars 310 may also be made of aluminum or other materials suitable for busing the electrical current. In the illustrated embodiment, different power sources may be used to supply electrical power to the busbars 310 through the electrical wires 312*a*, 312*b*. For example, the heating elements 302 may be powered by an AC or DC power source, wirelessly powered or powered by any suitable power source or combination of power sources. The discrete, separated ink segments 308 shown in FIG. 8 are one way to form the heating elements 302. Alternatively, in another embodiment, the heating device 300*b* includes heating elements 302 formed as long strips of carbon ink printed on the substrate 304 as shown in FIG. 9. In addition to the design layouts of the heating elements 302 shown in FIGS. 8 and 9, several different design layouts are possible by printing carbon ink or other suitable conductive ink on the substrate 304.

FIG. 10 shows an example of a layout of the heating devices 300*a*, 300*b* illustrated in FIGS. 8 and 9 above. As shown in FIG. 10, each heating device 300*a*, 300*b* is manufactured by printing the carbon ink segments 308 on the substrate 304 and attaching one or more of the busbars 310 (FIG. 8) to the substrate 304. An electrical insulating layer 314*a*, 314*b* made of Polyethylene Terephthalate (PET) or other suitable plastic or electrical insulating material, is attached to each side of the substrate 304. A grounding layer 316 made of a suitable conductive material, such as a grounding electrode made of copper or other suitable metal, is attached to one of the insulating layers 314*a*, 314*b*. The grounding layer 316 grounds the heating devices 300*a*, 300*b* and thereby helps prevent overheating of the heating devices or other electrical issues. Once the core of each of the heating devices 300*a*, 300*b* is made, a fabric material layer 318*a*, 318*b* is attached to the grounding layer 316 and to the bottom insulating layer 314*b*. The fabric material layers 318*a*, 318*b* may be any suitable material or combination of materials. For example, the fabric material layers may be a nonwoven fabric of the SMS, SMMS or SSMMS types having suitable hydrophobic qualities, where "S" stands for spunbound and "M" stands for meltblown.

Figure 11:
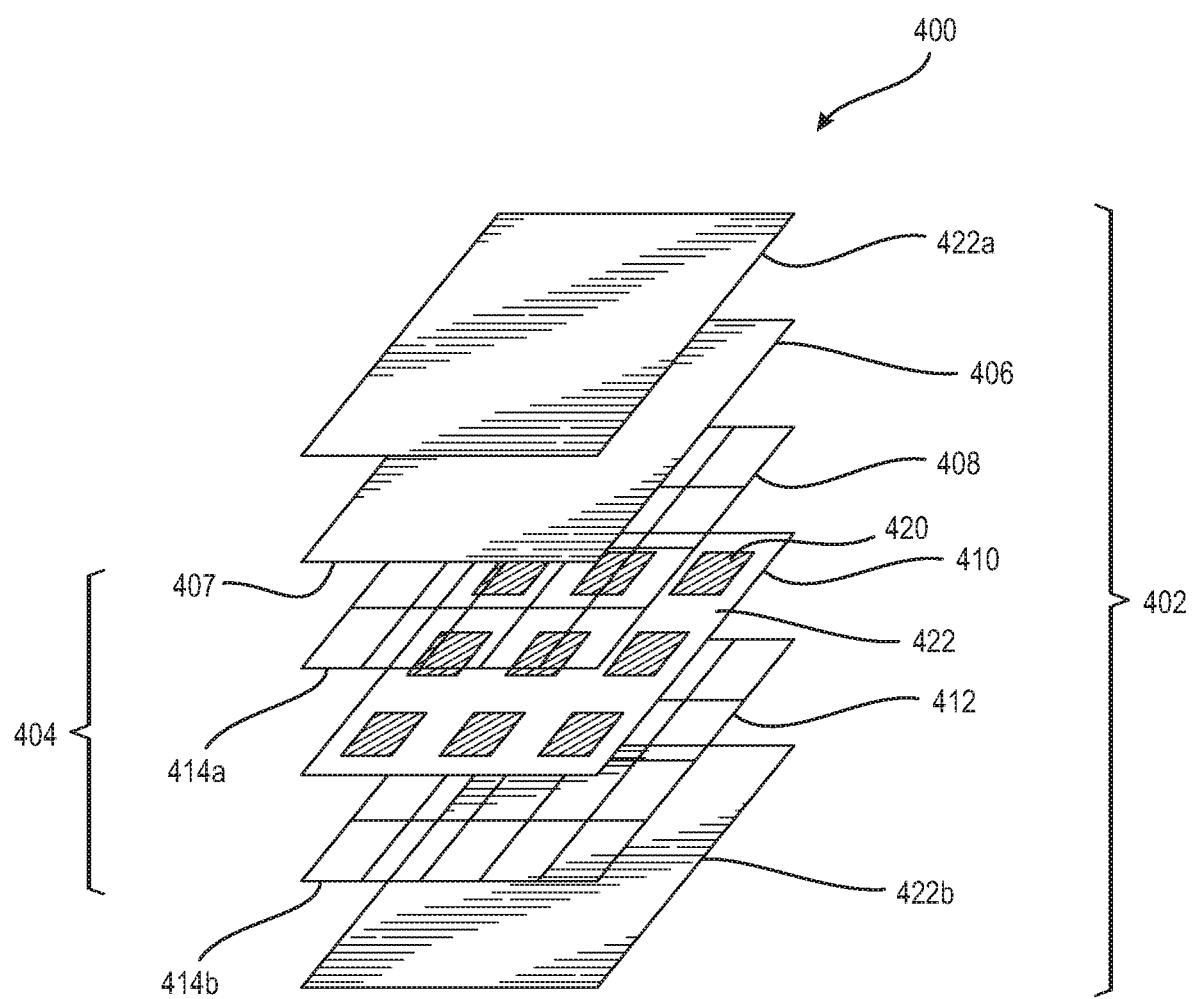
FIG. 11 is an exploded perspective view of another embodiment of the present floor heating system configured as a mat.

FIG. 11 shows an embodiment of the heating device 400 that is formed as a heating mat 402 that includes a core 404 comprising a grounding layer 406, a positive grid layer 408, an insulating layer 410 and a negative grid layer 412. The grounding layer 406 may be made out of any suitable conductive material, such as a grounding electrode made of copper, or another metal or conductive material, and is connected to a power source by an electrical grounding wire 407. As shown in FIG. 11, the positive grid layer 408 or positive electrode is attached to the grounding layer 406. The positive grid layer 408 is connected to a power source by a positive electrical wire 414*a* and has a positive electrical charge. Similarly, a negative grid layer or negative electrode 412 has a negative electrical wire 414*b* connected to the power source having a negative charge. The insulating layer 410 includes heating elements 420 and an insulating material 422 surrounding the heating elements so that the positive grid layer 408 only contacts a first side of each of the heating elements 420 and the negative grid layer 412 only contacts an opposing, second side of each of the heating elements thereby powering each of the heating elements 420 and enabling the heating elements to generate heat. The insulating material 422 is a non-conductive material that separates the positive and negative grid layers 414, 418 so that electricity only flows through the heating elements. Alternatively, spacers or separators (not shown) are placed at crossover points on the positive and negative grid layers 414, 418 to separate the positive and negative grid layers so that the positive grid layer and the negative grid layer only contact opposing sides of the heating elements 420 but not each other. A material layer 422*a*, 422*b* is respectively attached to the grounding layer 406 and the negative grid layer 412 to form the mat. It should be appreciated that the material layers 422*a*, 422*b* may be fabric layers or any suitable material layers.

In this embodiment, the heating elements 420 may be arranged in a grid pattern but may also be arranged in any suitable configuration. In use, the heating mat 402 may be placed under a floor, such as a tile floor, stone floor or concrete floor, or under carpeting. The heating mat 402 may also be attached to a wall, similar to wall paper, where an adhesive coating is applied to a surface of the heating mat and then the heating mat is attached to the wall. Alternatively, the heating mat 402 may be attached to a ceiling such as an inside surface or an outside surface of a ceiling. It should be appreciated that the heating mat 402 discussed above, may be attached to a surface by: applying an adhesive coating to a surface of the mat, forming a peel and stick membrane on a surface of the mat or the mat may be embedded in a layer of thinset mortar or any suitable material or attached using any suitable attachment method. In each application, the heating mat 402 may be cut to any dimension or size without affecting the supply of electrical power to the heating elements 420.

Figure 12:
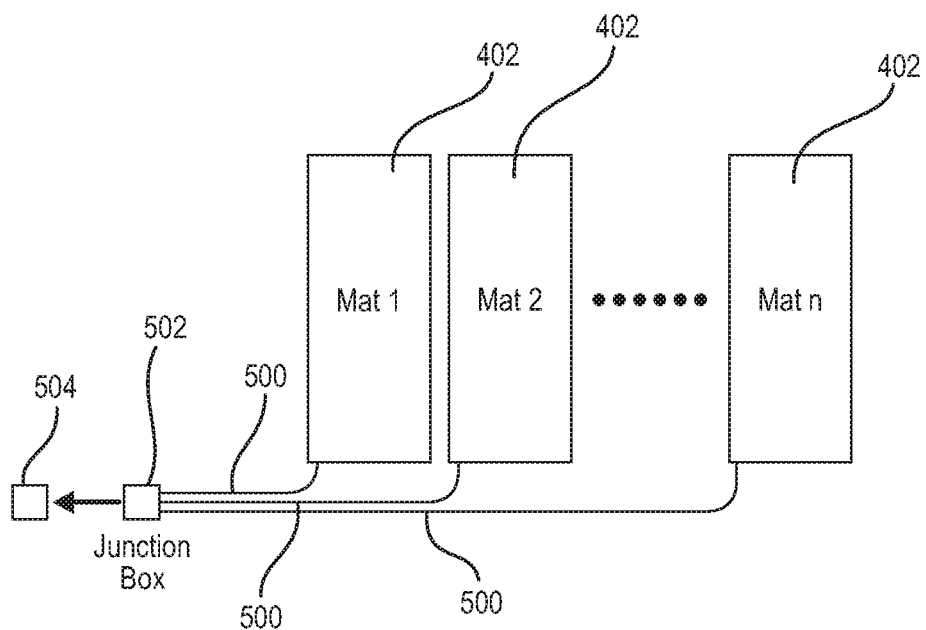
FIG. 12 is a schematic drawing of an embodiment of the floor heating system of FIG. 11 including a plurality of mats connected together where each mat has independent electrical wires connected to an electrical source.
Figure 13:
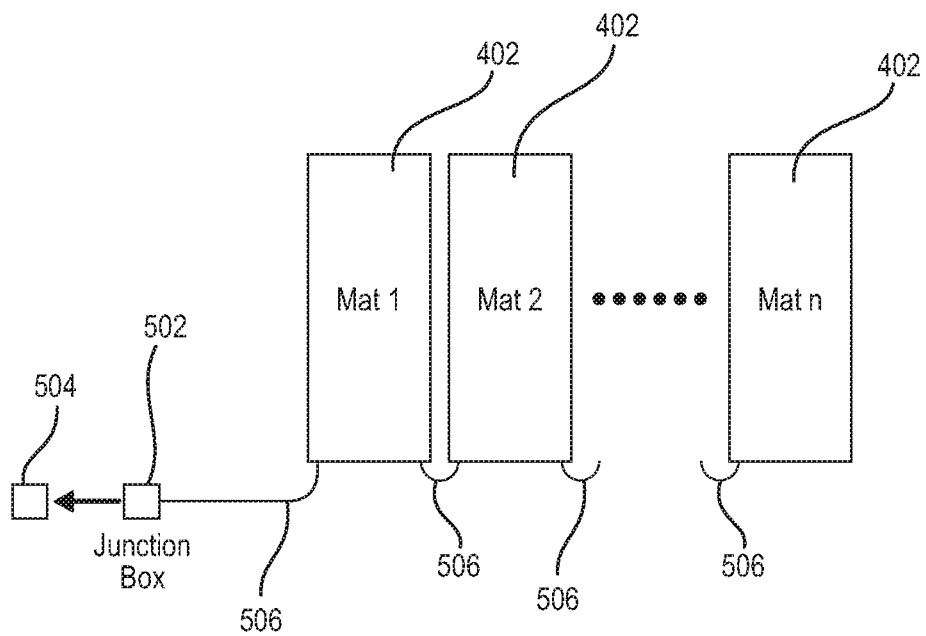
FIG. 13 is a schematic drawing of an embodiment of the floor heating system of FIG. 11 including a plurality of mats connected together where the electrical wires of each mat are connected to an adjacent mat and the electrical wires of one of the mats is connected to an electrical source.

Referring to FIGS. 12 and 13, a plurality of the heating mats 402 shown in FIG. 11 may be connected together to cover relatively large floor, wall and/or ceiling surface areas. In an embodiment, the heating mats 402 are each connected together, either in a side-by-side configuration shown in FIG. 13, an end-to-end configuration or in a combination of side and end connections. In this embodiment, an electrical cable 500 including the positive and negative electrical wires and the ground wire extend from each heating mat 402 are connected to an electrical power source, such as a junction box 502, and then to a thermostat 504.

In another embodiment shown in FIG. 13, the heating mats 402 are connected together as described above but the electrical cable 506 including the positive and negative electrical wires and grounding wire of each heating mat is connected to the immediately adjacent heating mat on one side when the heating mat is the first or last mat in a series of heating mats, or on each side when the heating mat is a middle or intermediate heating mat, in a daisy-chain configuration. In this embodiment, the heating mat at one of the ends of the series or chain of the heating mats 402 is the only mat connected to an electrical power source, such as the junction box 502, where electrical power is transferred from the junction box and then between each of the heating mats. The junction box 502 is also connected to a temperature controller, such as the thermostat 504, for controlling the temperature of the heating mat(s). Alternatively, the junction box 502 may be connected to a wireless controller so that the temperature of the heating mats may be controlled wirelessly via a remote Wi-Fi controller such as a laptop computer, a tablet computer or cellular phone. Similarly, each heating mat 402 in the series or chain of heating mats may have daisy chain connectors that are Wi-Fi controlled so that each heating mat is controlled independently of each adjacent heating mat. In the above embodiments, the temperature controller may be a smart thermostat such that one or more of the heating mats 402 may be set to a designated temperature, or the temperature of one or more heating zones including one or more of the heating mats 402 may be set to a designated temperature.

Figures 14A, 14B, 14C, 14D:
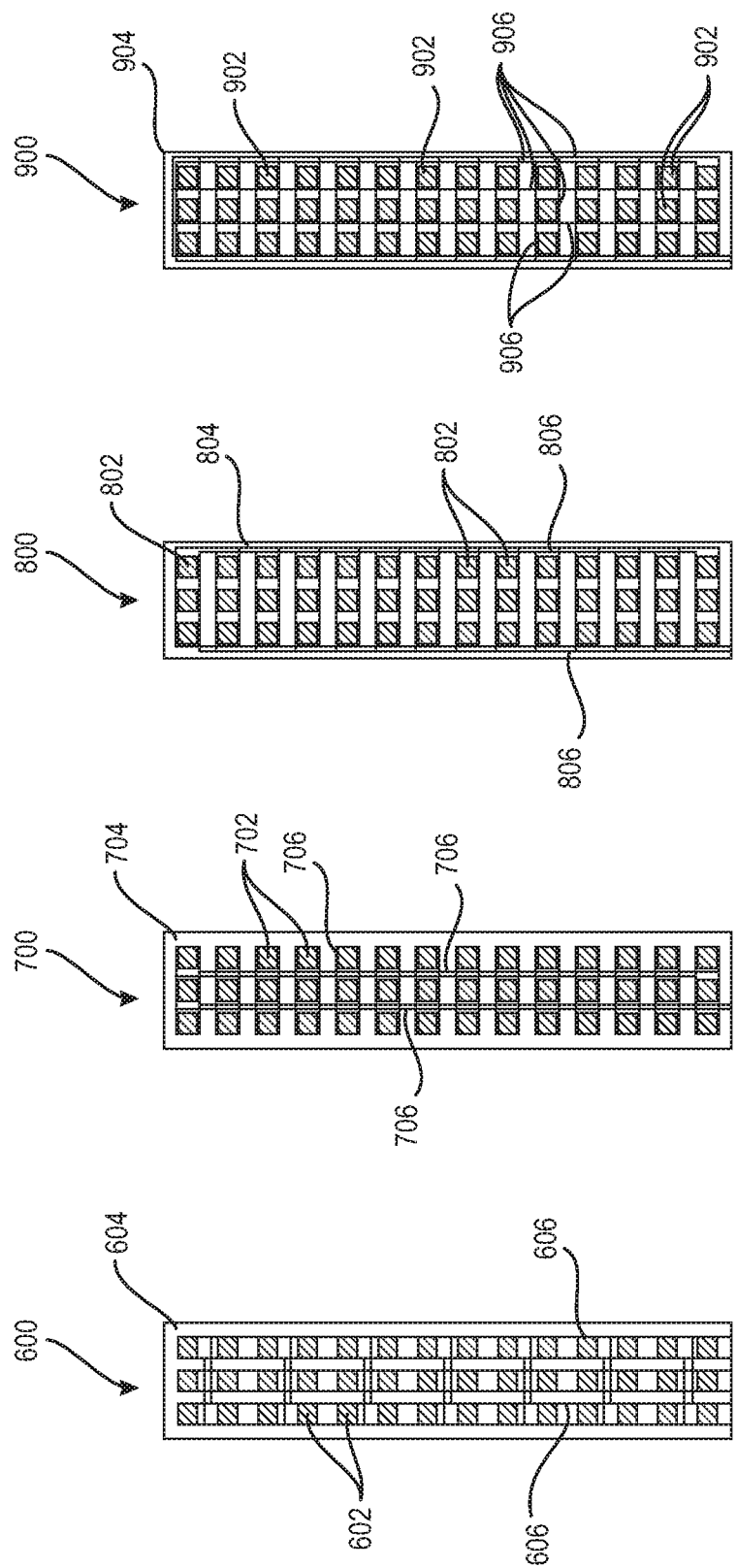
FIG. 14A is a schematic drawing of a further embodiment of the present floor heating system.
FIG. 14B is a schematic drawing of another embodiment of the present floor heating system.
FIG. 14C is a schematic drawing of a further embodiment of the present floor heating system.
FIG. 14D is a schematic drawing of another embodiment of the present floor heating system.

Referring to FIGS. 14A, 14B, 14C and 14D, additional embodiments of the present heating system are shown where the heating elements, busbars and wires of the heating devices are configured in different patterns to accommodate different floor, wall and ceiling layouts and areas. In FIG. 14A, the heating device 600 includes several rows of heating elements 602 on a membrane or substrate 604 where each row includes three of the heating elements 602 that are spaced from each other and are connected by at least one busbar 606 extending along at least one side of the heating elements. In FIG. 14B, the heating device 700 is similar to the heating device 600 in FIG. 14A except that the heating elements 702 are laterally positioned closer together on substrate 704 and are interconnected by busbars 706 positioned along sides of the heating elements and on the top and bottom sides of the heating elements. In FIG. 14C, the heating device 800 includes heating elements 802 that are arranged in a similar pattern on the substrate 804 to the heating elements in FIGS. 14A and 14B. In this embodiment, a busbar 806 is attached to each side of the substrate 804 and electrically connected to the heating elements. FIG. 14D shows a heating device 900 having heating elements 902 arranged in a similar pattern on substrate 904 to the heating elements in FIGS. 14A, 14B and 14C where a busbar 906 is attached to each side of the substrate and between each column of the heating elements. In these example embodiments, the heating systems are constructed similar to the heating system shown in FIG. 8, where the heating elements are printed on the membrane or substrate with a carbon ink having a designated resistance such that the heating elements may operate at voltages ranging from 6 volts to 240 volts depending on the designated resistance. It should be appreciated that the present heating system may have heating elements arranged in any suitable pattern or combination of patterns.

In the above embodiments, the membrane is made of a flexible material so that it can be rolled up in a roll for transport to a location and easily unrolled and cut at the location for installation. The width of the membrane may be five to six feet but may be any suitable width depending on the size and shape of a floor on which the heating device is being installed. As stated above, on larger floors, two or more of the heating devices may be installed side-by-side, where each of the heating devices is connected to the same or different power sources.

In conventional floor heating systems having electrical wire-type heating elements, the heating elements may be damaged during the installation of a finished floor over the heating system due to contact by a trowel, i.e., tile installation, or other tool when a finished floor is installed over the heating elements or during handling of the floor heating system at an installation location. Thus, the membrane of the present heating device is made of a durable and robust material to help resist damage to the membrane during installation of the heating device and during installation of a finished floor over the heating device.

In the above embodiments, the present floor heating system has intrinsic uncoupling properties to ensure that the heating system has enough flexibility to minimize stresses from the flooring substrate on a finished floor, such as a tile, stone or concrete floor, so that the finished floor is not compromised or damaged in any way. Also, it is contemplated that the above embodiments of the present floor heating system may be used to provide comfort heat, such as heating a cold tile floor, or as a primary heating source for a space, such as being the primary heating source for one or more rooms in a house or building or for an entire house or building.

Referring to FIGS. 15-19, in another embodiment, the present floor heating system 1000 includes a heating device 1002 having a flexible mat or membrane 1004 made of an insulating material, such as plastic, fiberglass or other suitable material. Several heating elements 1006 are arranged on the membrane 1004 in a pattern such as a grid pattern shown in FIG. 16. Electricity is supplied to the heating elements 1006 via positively charged electrodes or anodes 1008 and negatively charged electrodes or cathodes 1010 associated with each of the heating elements 1006 arranged in the grid pattern. The electrical current supplied to the heating elements 1006 causes the heating elements to generate heat. As shown, the electrical current is supplied to each of the anodes and cathodes by positive and negative electrical wires or cables 1012a, 1012b and a ground wire 1012c via busbars 1014 attached to the membrane 1004. In an embodiment, the electrical wires and ground wires 1012a, 1012b and 1012c are attached to a plug connector (not shown), which is connected to or plugged into a power source, such as an electrical outlet. In another embodiment, the electrical wires and ground wires 1012a, 1012b and 1012c are directly connected or hardwired to an electrical junction box 1014. It should be appreciated that the electrical wires and ground wires 1012a, 1012b and 1012c may be connected to any suitable power source. In the illustrated embodiment, the heating device 1002 has a thin profile and may be any suitable thickness that enables the heating device to be installed beneath a finished floor.

Figure 15:
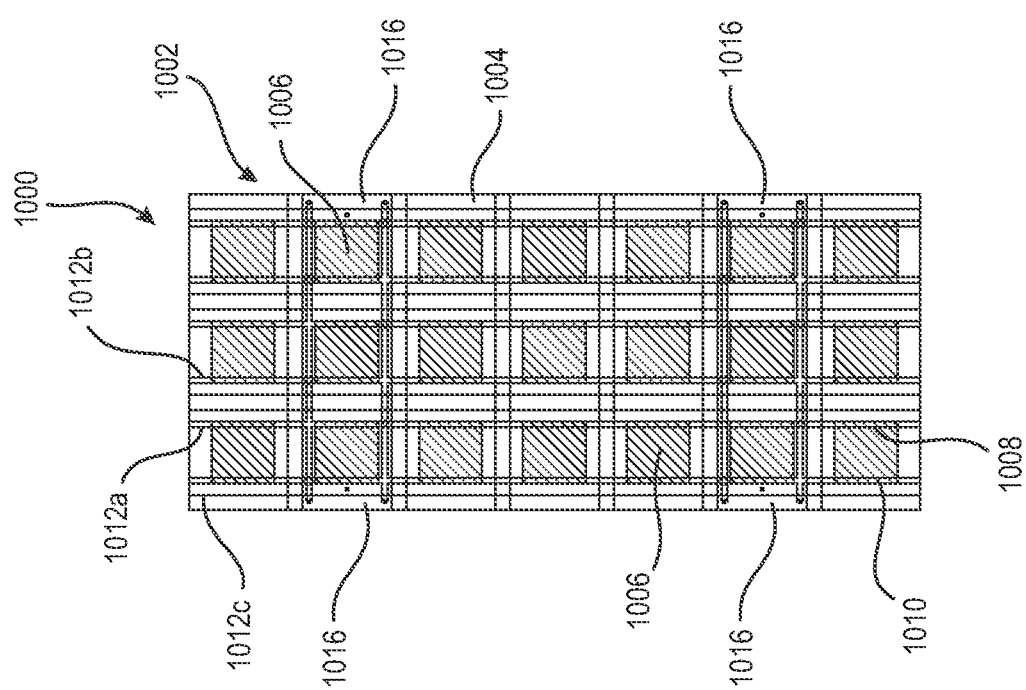
FIG. 15 is a schematic drawing of a further embodiment of a heating mat of the present floor heating system showing the different layers of the heating system.

FIG. 15 shows the different layers of the heating device 1002 after assembly where the positive, negative and ground wires 1012a, 1012b and 1012c interconnect each of the heating elements with a busbar 1015 on one or both sides of the mat 1004, where the busbars are metallic, insulated strips that distribute power received from a power source to the heating elements. Further, a pair of electrical coupling members or electrical couplers 1016 are attached to each of the busbars 1015 to convey electrical current to one or more adjacent heating devices 1002. In the illustrated embodiment, each of the electrical coupling members 1016 includes a positive male connector or positive post 1018a, a negative male connector or negative post 1018b and a ground male connector or ground post 1018c.

Figure 16:
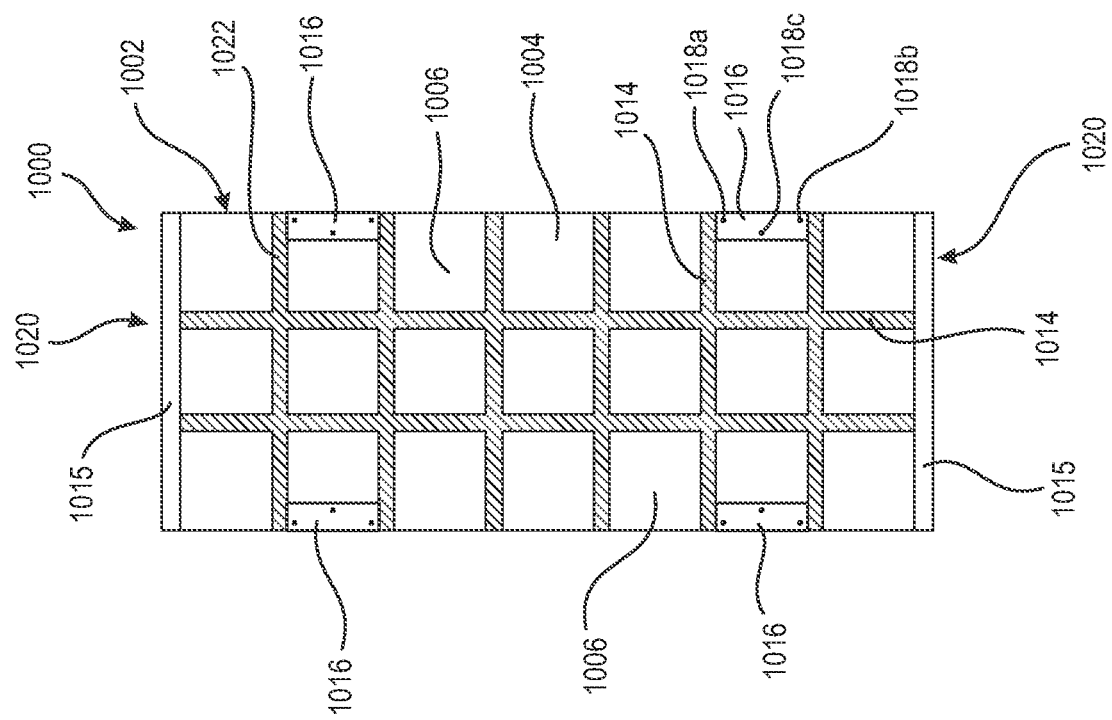
FIG. 16 is a schematic drawing of a finished heating mat of the floor heating system of FIG. 15.

FIG. 16 shows a finished heating device 1002 with sealed opposing ends 1020 and an insulating, water resistant coating 1022 applied to the busbars in the spaces between the heating elements 1006 to insulate and protect the busbars, i.e., the electrical wiring, connecting the heating elements with the busbars. The coating 1022 helps to clearly identify the spaces between the heating elements 1002, where the spaces define the grid pattern and also define the cutting lines of the heating devices. It should be appreciated that the insulating coating 1022 may be any suitable coating and may have any suitable color to help identify the spaces, i.e., cutting lines, between the heating elements.

Figure 17:
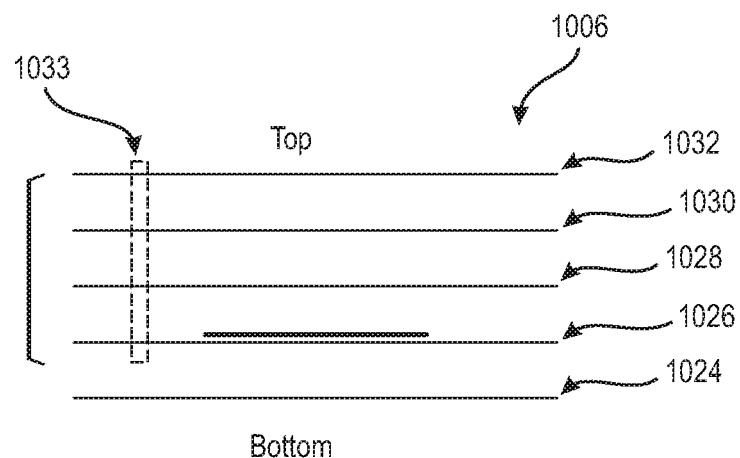
FIG. 17 is a schematic drawing showing the configuration of the material layers of the floor heating mat of FIGS. 15 and 16.

FIG. 17 shows the different layers of the heating devices 1006 of FIGS. 16 and 17. Specifically, in this embodiment, each heating device 1006 includes a first layer or bottom layer 1024, which is an uncoupling layer, made of an insulating material, such as a plastic or rubber material, that is suitable to be placed on an underlying surface such as a sub-floor. A second layer or heating layer 1026 including the heating elements 1006, electrical wiring 1012a, 1012b, ground wires 1012c, i.e., busbars 1014, and busbars 1015, is placed on and secured to the first layer. Next, a third layer or separating layer 1028 made of an insulating material, is placed on the second layer 1026. A fourth layer or grounding layer 1030 is placed on the third layer 1028 and includes ground wires or other grounding member that is connected to the ground wires of the second layer 1026. A fifth layer or top layer 1032 is a trilaminate having three layers each made of an insulating, water resistant material that combine to seal the top of the heating device 1002 to help protect the heating device from damage from wear and water or moisture. During assembly of the heating device 1002, three generally cylindrical conductive posts or conductors 1033 are inserted through the second, third, fourth and fifth layers as shown in FIG. 17 and extend a distance from the top layer to form the positive post 1018*a*, the negative post 1018*b* and the ground post 1018*c* in each electrical coupling member. It should be appreciated that the conductive posts may be made out of metal or any suitable conductive material or combination of materials.

Figure 18:
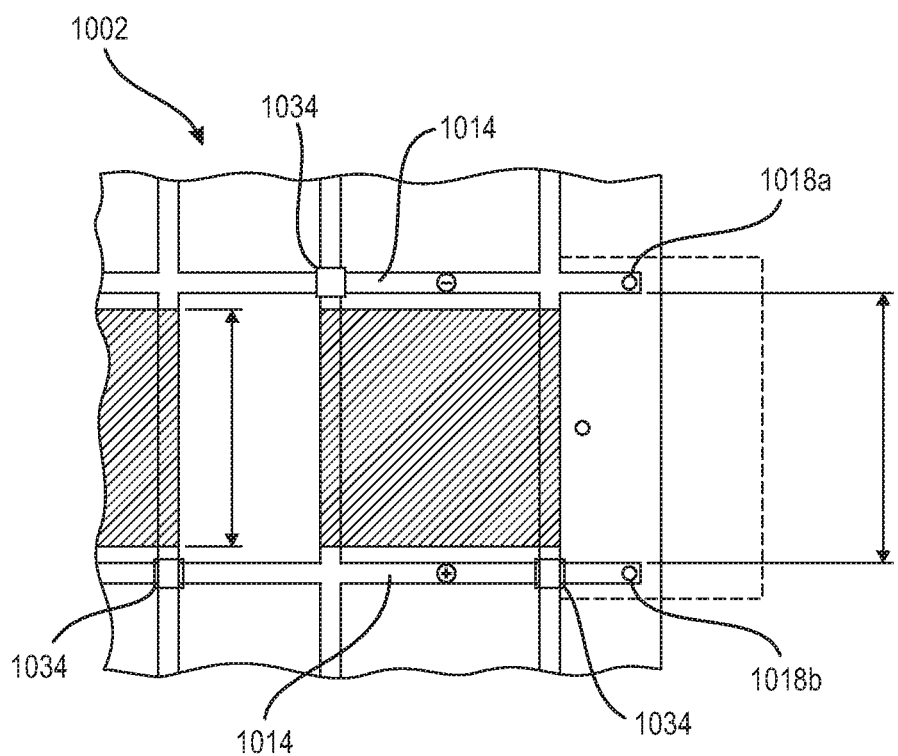
FIG. 18 is a schematic drawing of an enlarged, fragmentary view of a portion of the floor heating mat of FIGS. 15 and 16.

FIG. 18 shows an enlarged section of the heating device 1002 where the positive and negative busbars 1014 connect each of the heating elements 1006 with the positive and negative posts 1018*a*, 1018*b* of one or more of the electrical coupling members 1016. An insulator 1034, such as an insulating material, is placed between the positive and negative busbars 1014 at the points where the positive and negative busbars overlap each other in the grid pattern. In an embodiment, the heating device 1002 are configured so that each heating element is approximately (6.0) six inches by (6.0) six inches and the distance between the positive and negative posts in each electrical coupling member is 6.75 inches. It should be appreciated that the heating elements 1006 may have any suitable dimensions and the positive and negative posts may be any suitable distance apart from each other.

Figure 19A:
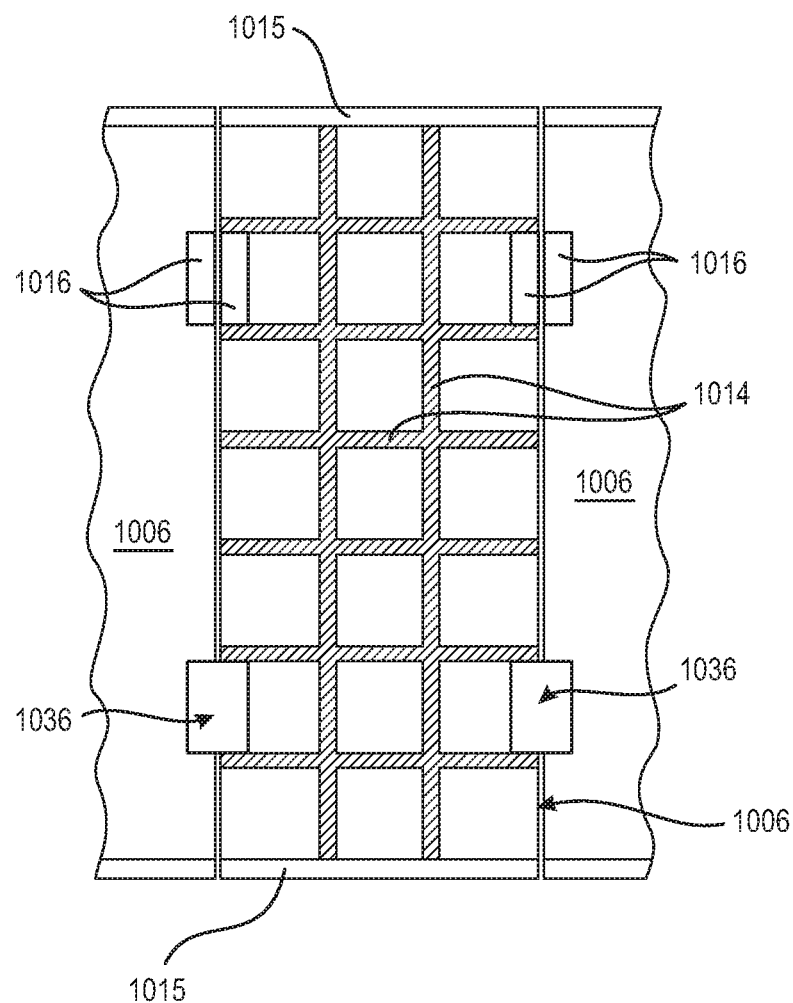
FIG. 19A is a schematic drawing of an enlarged, fragmentary view of a plurality of floor heating mats positioned adjacent to each other.
Figure 19B:
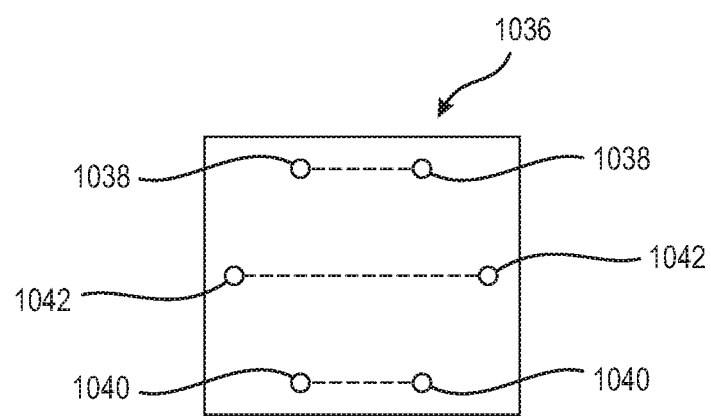
FIG. 19B is a schematic drawing of an embodiment of a heating device coupling member.

Referring to FIGS. 19A and 19B, the heating devices 1006 are placed on a surface of an area, such as on a floor of a residential or commercial building, so that the electrical coupling members 1016 of each of the heating devices are adjacent to each other. In this way, the adjacent electrical coupling members 1016 of the heating devices 1002 can be connected or coupled to each other to convey electrical current between the heating devices. Specifically, a heating device coupling member or female coupling member 1036 shown in FIG. 19B is made of an insulating and water-resistant material and includes two positive receptacles 1038, two negative receptacles 1040 and two ground receptacles 1042 that are each interconnected by electrical wires as shown by the dashed lines. Each of the positive receptacles 1038, negative receptacles 1040 and the ground receptacles 1042 are configured to have a shape that matingly engages corresponding positive posts 1018*a*, negative posts 1018*b* and ground posts 1018*c* of adjacent heating devices. For example, the positive receptacle 1038, the negative receptacle 1040 and the ground receptacle 1042 of the heating device coupling member 1036 matingly engages the positive post 1018*a*, the negative post 1018*b* and the ground post 1018*c* of heating device shown in FIG. 19A. Similarly, the positive receptacle 1038, the negative receptacle 1040 and the ground receptacle 1042 of the heating device coupling member 1036 matingly engages the positive post, the negative post and the ground post of adjacent heating device. In this way, the heating device coupling member 1036 enables electricity, i.e., electrical current, to travel through and between each of the heating devices 1002 used to cover a designated area. In the illustrated embodiment, the heating device coupling member 1036 has a thickness of 0 mm to 6.50 mm but may be any suitable thickness. In an embodiment, the heating device coupling member 1036 has a thickness of 0.25 inches (6.35 mm).

Figure 20:
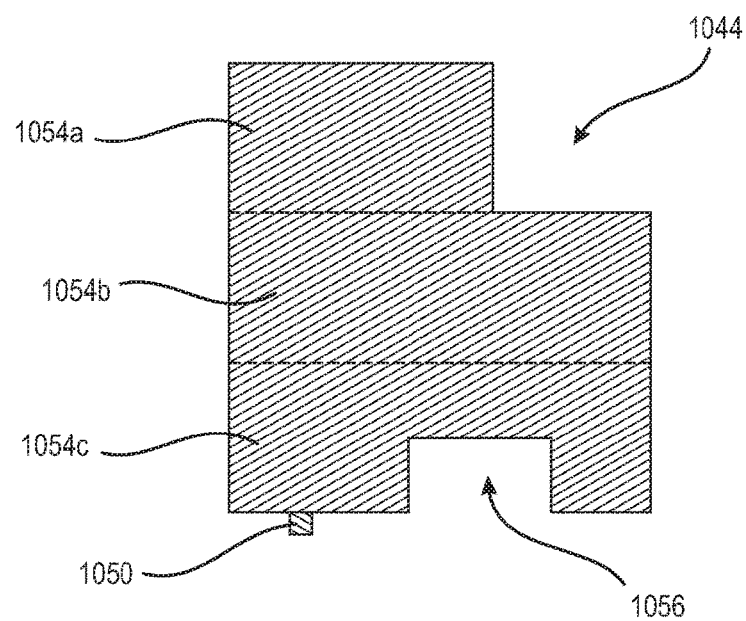
FIG. 20 is a schematic drawing of a floor area without the present heating system.
Figure 21:
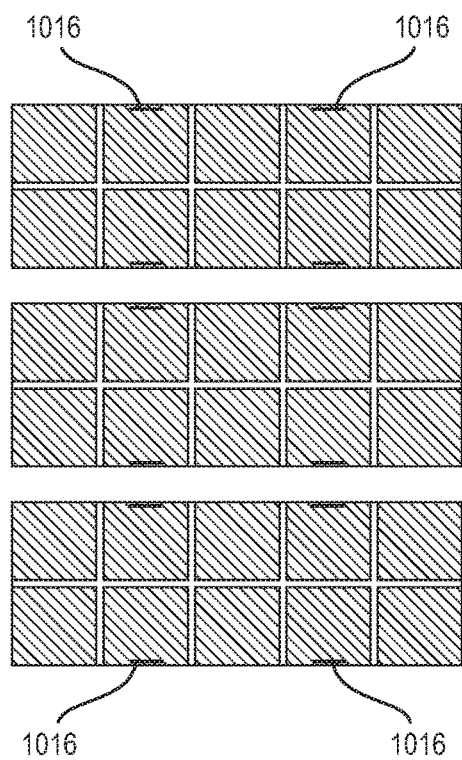
FIG. 21 is a schematic drawing of a plurality of floor heating mats of the present floor heating system.
Figure 22:
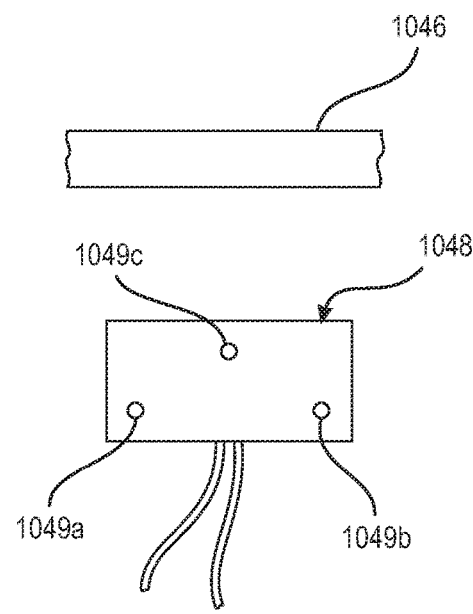
FIG. 22 is a schematic drawing showing an embodiment of the sealing tape, the mat connectors and the junction connector of the present floor heating system of FIGS. 15 and 16.

Referring now to FIGS. 20 to 26, the heating devices 1002 are used to provide heat to a designated area 1044 in a residential or commercial building. As shown in FIG. 20, the designated area has several different sections with different dimensions and/or shapes. The heating devices 1002 shown in FIG. 21 will be used to cover the designated area 1044 and provide heat to a finished floor, such as a tile or carpeted floor, installed on the interconnected heating devices. FIG. 22 shows finishing tape 1046, which is used to cover and seal the cut edges of the heating devices 1002, the electrical coupling members 1016 and the heating device coupling members 1036, and a junction coupling member 1048 having a positive receptacle 1049*a*, a negative receptacle 1049*b* and a ground receptacle 1049*c*, which connects to one the electrical coupling members of the heating devices as described above, and includes positive, negative and ground wires that connect to an electrical junction box 1050 (FIG. 20) or other suitable power source to supply electricity to the floor heating system.

Figure 23:
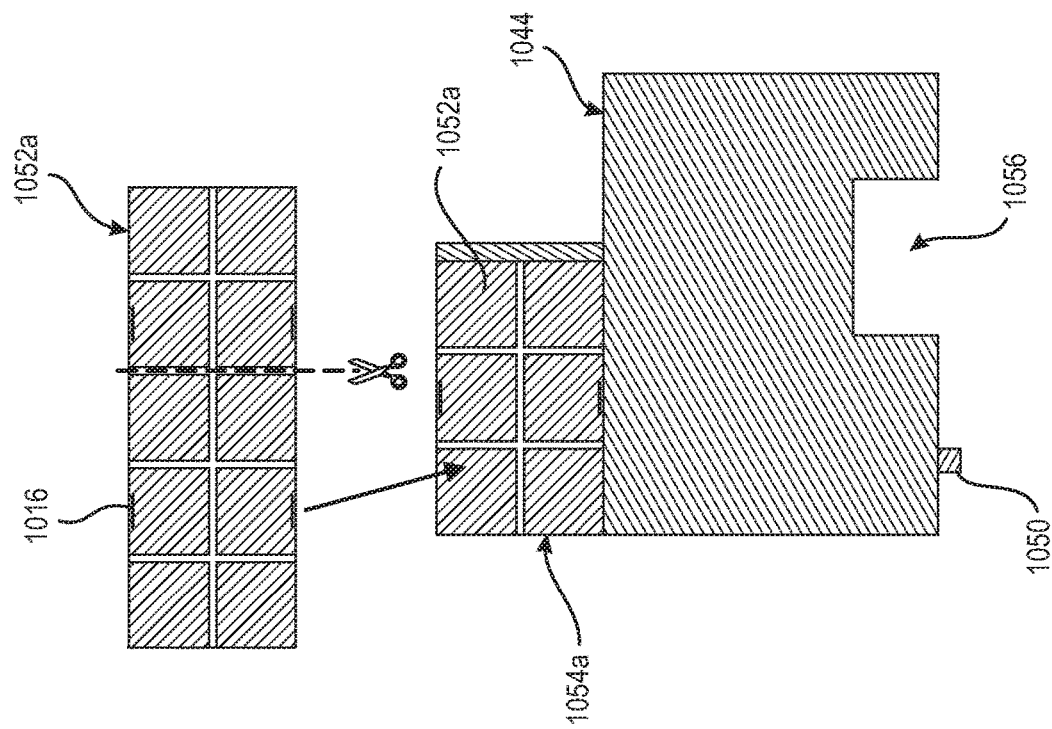
FIG. 23 is a schematic drawing showing a portion of a heating mat installed on the floor area of FIG. 20.

Referring to FIG. 23, a first heating device 1052*a*, which has a length and width that are greater than the length and width of the section of the area 1044, is cut to have a length and width that correspond to the length and width of section 1054*a*. Preferably, the heating device 1052*a* is cut along one of the cutting lines, but may be cut at any designated angle or shape that corresponds to the shape and/or dimensions of the section of the area being covered, as long as the cut portion of the heating device includes at least one of the electrical coupling members 1016. As shown in FIG. 23, the heating device is cut to the desired shape or dimensions, and then placed in the surface of the section of the area. It should be appreciated that the heating device 1052*a* may be placed on the surface of area 1044 without being secured to the surface, or secured to the surface using an adhesive or other suitable attachment method.

Figure 24:
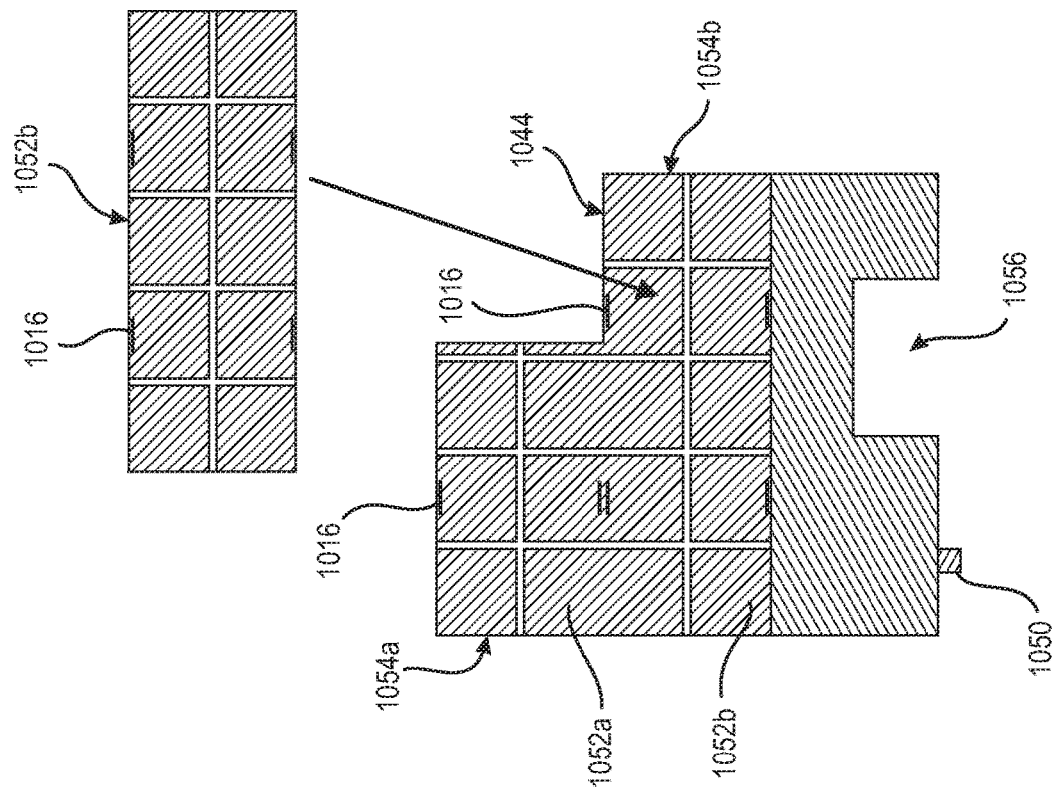
FIG. 24 is a schematic drawing showing another portion of a heating mat installed on the floor area of FIG. 20.

Referring to FIG. 24, a second heating device 1052*b* is placed on the surface of the area 1044 where the second heating device is positioned to be adjacent to the first heating device 1052*a* so that an electrical coupling member 1016 of the first heating device 1052*a* is directly adjacent to an electrical coupling member 1016 of the second heating device 1052*b*. Note that since the dimensions and/or shape of the area covered by the second heating device 1052*b* correspond to the dimensions and/or shape of the second heating device, the second heating device did not need to be cut to cover the second section 1054*b* of the area 1044.

Referring to FIG. 25, a third heating device 1052*c* is placed on the third section 1054*c* of the area 1044. The third section 1054*c* has a rectangular indented section 1056 such that the third heating device 1052*c* must be cut to fit on the surface of the third section. Specifically, the third heating device 1052*c* has a length and width that correspond to the overall length and width of the third section 1054*c*. Thus, the third heating device 1052*c* must be measured and cut to remove a portion of the heating device corresponding to the shape and/or dimensions of the indented section 1056. After being cut, the third heating device 1052*c* is placed on the surface of the third section 1054*c* so that the electrical coupling members 1016 of the third heating device 1052*c* are adjacent to and/or aligned with the electrical coupling members 1016 of the second heating device 1052*b*.

Referring to FIG. 26, after the first, second and third heating devices 1052*a*, 1052*b* and 1052*c* are placed on the surface of the area 1044 to be heated, the heating device coupling members 1036 are attached to each of the adjacent and/or aligned electrical coupling members 1016 of the first, second and third heating devices as described above to electrically couple or connect the first, second and third heating devices to each other. This enables electricity to move from the electrical power source, i.e., the electrical junction box 1050, to each of the first, second and third heating devices 1052a, 1052b and 1052c so that the first, second and third heating devices generate heat for heating a finished floor placed on top of the heating devices. It should be appreciated that the heating device coupling members 1036 may be attached to adjacent electrical coupling members 1016 of the heating devices 1052a, 1052b and 1052c as each heating device is placed on the surface or after all of the heating devices are placed on the surface.

While particular embodiments of the present floor heating system are shown and described, it will be appreciated by those skilled in the art that changes and modifications may be made thereto without departing from the invention in its broader aspects and as set forth in the following claims.

What is claimed is:

1. A heating system for a floor, the heating system comprising:
    a plurality of heating devices, each of said heating devices including a membrane, a plurality of heating elements and at least one electrical coupling member including an upper surface that is coupled to said plurality of heating elements and attached to said membrane; and
    at least one heating device coupling member being placed on top of said upper surface and attached to said at least one electrical coupling member on adjacent heating devices of said plurality of heating devices, said at least one heating device coupling member conveying electricity between said adjacent heating devices,
    wherein said at least one electrical coupling member includes a positive post, a negative post and a ground post, and
    wherein said at least one heating device coupling member includes two positive receptacles, two negative receptacles and two ground receptacles, said two positive receptacles, said two negative receptacles and said two ground receptacles being configured to respectively matingly engage said positive post, said negative post and said ground post of said at least one electrical coupling member of said adjacent heating devices.

2. The heating system of claim 1, further comprising a junction coupling member configured to be attached to said at least one electrical coupling member on at least one of said plurality of heating devices and to an electrical power source.

3. The heating system of claim 1, wherein each of said heating elements includes at least one positively charged electrode and at least one negatively charged electrode.

4. The heating system of claim 1, wherein said plurality of heating elements on each of said plurality of heating devices are arranged in a grid pattern.

5. The heating device of claim 1, wherein said membrane is made of an insulating material.

6. The heating device of claim 1, wherein each of said plurality of heating devices includes cutting lines, wherein said plurality of heating devices are cut along at least one of said cutting lines.

7. The heating device of claim 1, wherein said at least one heating device coupling member is planar.

8. A method for heating a surface in a designated area, the method comprising:
    placing a plurality of heating devices on the surface of the area, each of said plurality of heating devices including a membrane, and plurality of heating elements and at least one electrical coupling member attached to said membrane, at least one of said plurality of heating devices being connected to an electrical power source that supplies electricity to said plurality of heating devices;
    aligning said at least one electrical coupling member of adjacent heating devices of said plurality of heating devices; and
    placing a heating device coupling member on top of said at least one electrical coupling member of said adjacent heating devices and attaching said heating device coupling member to said at least one electrical coupling member of said adjacent heating devices, said heating device coupling member conveying electricity between said adjacent heating devices,
    wherein said at least one electrical coupling member of said plurality of heating devices includes a positive post, a negative post and a ground post, and
    wherein said at least one heating device coupling member includes two positive receptacles, two negative receptacles and two ground receptacles, said two positive receptacles, said two negative receptacles and said two ground receptacles being configured to respectively matingly engage said positive post, said negative post and said ground post of said at least one electrical coupling member of adjacent heating devices.

9. The method according to claim 8, further comprising cutting at least one of said plurality of heating devices to fit on a portion of the surface of the area.

10. The method according to claim 8, further comprising forming cutting lines on said plurality of heating devices, and cutting at least one of said plurality of heating devices along at least one of said cutting lines.

11. The method of claim 8, further comprising a junction coupling member attached to said at least one electrical coupling member of at least one of said heating devices, and to an electrical power source, said junction coupling member configured to convey electricity from said electrical power source to said at least one electrical coupling member.

* * * * *